United States Patent [19]
Taguchi et al.

[11] Patent Number: 5,215,397
[45] Date of Patent: Jun. 1, 1993

[54] WRITING DEVICE FOR STORING HANDWRITING

[75] Inventors: Toshio Taguchi; Kiyoshi Agusa, both of Kyoto; Takashi Fukuda, Uzi, all of Japan

[73] Assignee: Yashima Electric Co., Ltd., Japan

[21] Appl. No.: 859,680

[22] Filed: Mar. 30, 1992

[30] Foreign Application Priority Data

Apr. 1, 1991 [JP] Japan .................................. 3-068150
Feb. 4, 1992 [JP] Japan .................................. 4-018854

[51] Int. Cl.$^5$ .............................................. G06K 9/24
[52] U.S. Cl. .................................... 401/194; 401/195; 382/3; 382/59; 73/862.51; 73/862.541
[58] Field of Search .............. 73/862.54, 862.04, 865.4; 382/3, 59; 401/194, 195

[56] References Cited

U.S. PATENT DOCUMENTS

| | | |
|---|---|---|
| 3,906,444 | 9/1975 | Crane et al. .......................... 382/3 |
| 4,141,073 | 2/1979 | Tan .................................... 382/59 X |
| 4,217,649 | 8/1980 | Doundoulakis .................. 178/19 X |
| 4,241,409 | 12/1980 | Nolf ..................................... 382/59 |
| 4,513,437 | 4/1985 | Chainer et al. ............... 73/865.4 X |
| 4,856,077 | 8/1989 | Rothfjell ................................ 382/3 |
| 4,896,543 | 1/1990 | Gullman ................................. 382/3 |

FOREIGN PATENT DOCUMENTS 120285 6/1986 Japan ..................................... 382/58

Primary Examiner—Danton D. DeMille
Attorney, Agent, or Firm—Beveridge, DeGrandi, Weilacher

[57] ABSTRACT

When characters and the like are written with a writing device, handwriting is detected by a handwriting detection circuit based on outputs from optical sensors and stress sensors and is stored in a handwriting memory section. The handwriting memory section stores the handwriting whereby it can be used as input data for a computer and the like without reductions in the convenience in using the writing device.

7 Claims, 12 Drawing Sheets

WRITING DEVICE FOR STORING HANDWRITING

BACKGROUND OF THE INVENTION

The present invention relates to a novel writing device for storing handwriting.

When a lot of information is to be kept with ease, the information is generally written as characters, figures and the like on paper and the like using a writing device such as a ball point pen, a propelling pencil and the like, then the paper and the like are preserved.

On the other hand, an inputting device such as a keyboard, a mouse, a digitizer, a touch panel, a light-pen and the like are provided for inputting representations of human intention in an electric processing apparatus such as a computer and the like.

A writing device represented by a pen is used as one means for communicating one's mind to another person. The writing device can be used by any person. But information written by the writing device cannot be directly input to an electric processing apparatus such as a computer and the like. A disadvantage arises that a character recognition apparatus, a keyboard or the like additionally is required.

At present, an input device for a computer utilizing processings may be various devices such as a keyboard, a mouse, a digitizer, a pen utilized input apparatus or the like, as has been mentioned earlier. But the input device is not sufficiently convenient for supporting a noting which is a result of writing in the ordinary behavior of a man. An electric memorandum device is useful in supporting the noting function but is quite different from writing information resulting from using the writing device. That is, a writing device such as a pen, a pencil, a writing brush or the like is the most superior device because a man can use the writing device with ease. An input device is required having the similar advantage as of the writing device. When the writing device is employed to write information on paper, the paper on which information are written can easily handed to another person. Further, the thinking of man is remarkably influenced by language and expressions. There is strong demand for a device which can be used for handing a thinking process to another person, accordingly.

SUMMARY OF THE INVENTION

It is an object of the present invention to store handwriting in a writing device.

It is another object of the present invention to store handwriting so that it can be input to a computer and the like.

It is a further object of the present invention to store handwriting for allowing outputting of spacially expressed handwriting in time sequential written order.

It is a still further object of the present invention not to decrease the simplicity in using a writing device.

It is yet a further object of the present invention not to require paper or the like for storing handwriting.

To perform the objects above-mentioned, a writing device for storing handwriting according to the present invention comprises;

writing means, handwriting detection means for detecting a locus of a character, a figure and the like which is written by the writing means, storing means for storing the detected locus, and casing means for housing the writing means, the handwriting detection means and the storing means therein.

The writing means may be a writing device means such as a pencil, a pen, a ball point pen, a crayon, a piece of chalk and the like for writing a thin line or a thick line. The writing device means may include watercolor ink, oil based ink, water base paint, oil paint or the like. The writing device means may have an arrangement such that a writing section at its edge is exchangeable, or a writing section at its edge is able to be delivered outwardly. The ink, the paint or the like may be housed in a cartridge or may be directly supplied to the writing section. The line may be colored with an arbitrary color. In this case, it is preferable that the handwriting detection means detect the arbitrary color.

When the writing device is employed, a character, a figure or the like is written on paper and the like by grasping the casing of the writing means. The character, a locus of the figure or the like is detected by the handwriting detection means. The detected locus is stored by the storing means. An advantage arises in that only the writing device for storing handwriting is required to be preserved and paper on which characters, figures and the like have been recorded is not required to be preserved because handwriting is stored in the writing device. Further, data stored in the storing means can be transferred to an electric processing apparatus by coupling the storing means with the electric processing apparatus. The stored data can be reproduced by the electric processing apparatus in a time sequential manner so as to reproduce the thinking process of a man at the time he recorded the characters, figures and the like.

It is preferable that the handwriting detection means include an optical sensor for optically detecting handwriting written on paper or the like, a stress sensor such as a piezoelectric transducer, a strain gauge and the like for detecting force applied to the writing means during a writing operation and locus detection means for detecting the locus of the writing means based on signals output from the optical sensor and the stress sensor.

In this case, when the writing means is pressed to paper or the like, the locus of the writing means is detected by the locus detection means based on signals output from the stress sensor and/or the optical sensor. On the other hand, when the writing means is apart from paper or the like, the locus of the writing means is detected by the locus detection means based on signals output from the optical sensor. Consequently, the locus from beginning to end is detected without interruption, even when the writing means is separated from the paper or the like during handwriting.

The optical sensor may include a lens, an optical fiber and a charge coupled device chip (hereinafter referred to as CCD chip). The optical sensor may include three lenses which are disposed at every 120 degrees in shifted positions with respect to the writing means. The optical sensor may include a lens which surrounds the writing means and a CCD chip which also surrounds the writing means. The optical sensor may include only a CCD chip which surrounds the writing means.

It is also preferable that the writing device for storing handwriting include at least one pair of lenses which are disposed symmetrically with respect to the writing means, a CCD chip and image compensation means for obtaining an image of the edge of the writing means based on image signals corresponding to each lens obtained by the CCD chip.

The handwriting detection means may include an optical sensor and locus detection means.

The handwriting detection means may be a gyrocompass.

The writing means may be means to draw lines using ink which includes a magnetic substance and the handwriting detection means may be a magnetic sensor.

It is further preferable that the casing means includes two casing part means which are removably connected to one another and the storing means is housed in one of the casing part means.

The following advantages are exhibited by the present invention because the writing means, the handwriting detection means and the storing means are housed in the casing means.

(I) Though the locus of characters, figures and the like are stored as they are, the characters, figures and the like when written on paper or the like by a man on his way can be preserved by preserving only the writing device for storing its handwriting. That is, paper or the like is not required to be preserved, the paper or the like having written characters, figures and the like thereon.

(II) When the contents of arrangements made on the man's way are to be input in a computer or the like, the stored contents in the writing device for storing handwriting can easily be input, as they are, to a computer or the like without reading the contents on the paper or the like by an image-sensor or the like.

(III) A man can use the writing device for storing handwriting similar to conventional writing devices. As a result, a man can deal with a computer naturally without having a sense of alienation from the computer.

(IV) The writing device for storing handwriting sufficiently functions as an input device for a computer because difference between languages are treated by computer software even when a language to be input to the computer varies.

(V) Conversation can be had by writing between men having different languages or characters from one another by employing the writing device for storing handwriting as an input device for a computer with translating software.

(VI) Handwriting, existing feelings, anger, pleasure and the like are stored as they are in the drawn sequence. Handwriting, existing feelings, anger, pleasure and the like are reproduced as they are in a drawing sequence.

(VII) The writing device for storing handwriting stores the handwriting of a man as image information and supports the thinking process of the man, because the initial stage of the thinking process is an image which is not fixed and the image will be fixed and actualized after the thinking becomes deeper.

(VIII) The writing device for storing its handwriting can be utilized in various technical fields such as research in the psychology of a little child, handwriting judgement, and a communication helping apparatus for a deaf-and-dumb person.

These and other objectives, features and advantages of the present invention will be more readily understood upon consideration of the present invention, in conjunction with the accompanying drawings.

BRIEF DESCRIPTION OF THE DRAWINGS

FIG. 9 is a diagram showing an arrangement of a system which reads data out from the writing device according to the second embodiment of the present invention and reproduces characters, figures and the like;

BRIEF DESCRIPTION OF THE PREFERRED EMBODIMENTS

Figure 1:
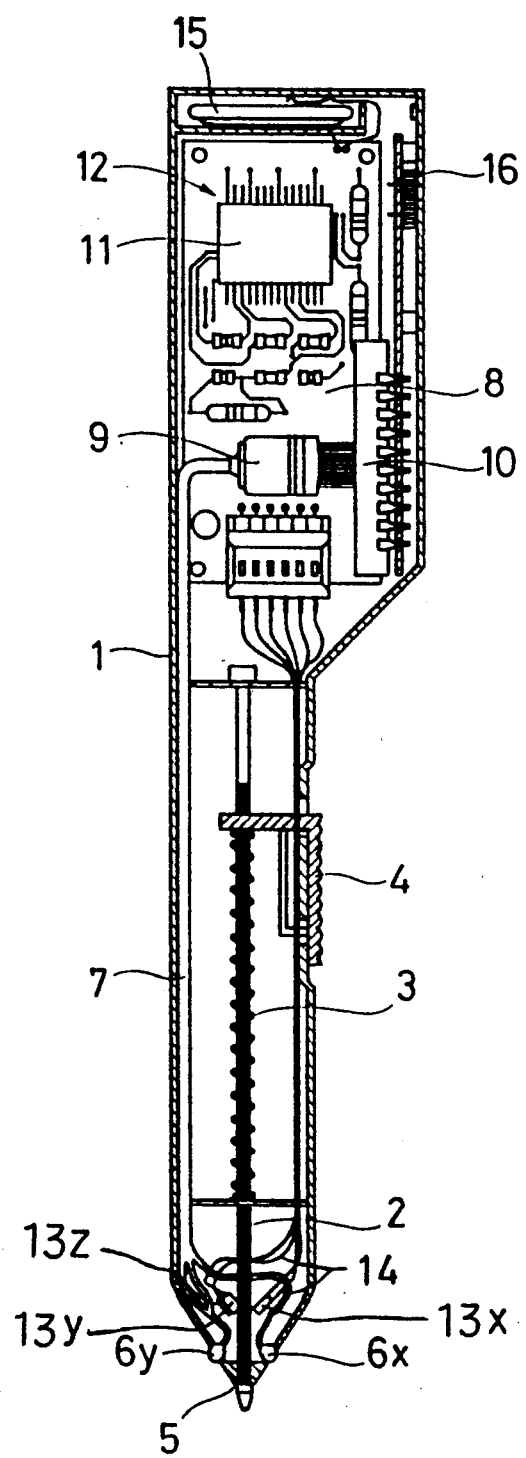
FIG. 1 is a cross-sectional view showing an inner mechanism of a writing device for storing handwriting according to a first embodiment of the present invention.

FIG. 1 is a cross-sectional view showing an inner mechanism of a writing device for storing handwriting according to a first embodiment of the present invention.

Figure 2:
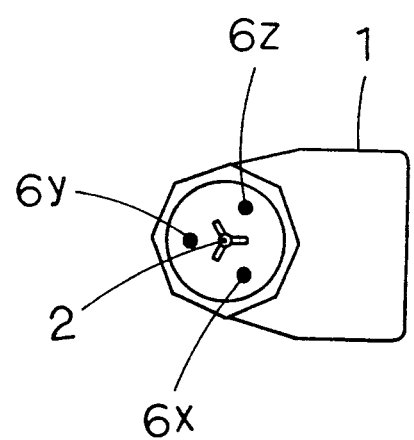
FIG. 2 is a bottom view of the writing device shown in FIG. 1.

A core 2 of a ball point pen is provided in the center of a lower portion of a cylindrical casing 1. The core 2 is arranged to move freely outwardly and inwardly of the casing through an opening 5 which is formed at the bottom edge of the casing 1, by a coil spring 3 and an operative projection 4. Three lenses 6x, 6y and 6z (FIG. 2) are provided at the bottom edge of the casing 1. Three lenses are projected outward and are arranged at every 120 degrees with respect to the core 2. Light collected by these lenses 6x, 6y and 6z is guided by optical fibers 7 to a lens 9 which is disposed with respect to a circuit board 8 housed in an inner upper portion of the casing 1. Light guided through the lens 9 is transformed into electrical signals by a CCD chip 10 which is mounted on the circuit board 8 and the transformed electrical signals are input in an electrical circuitry section 12 which includes LSI 11 and the like. Piezoelectric transducers 13x, 13y and 13z are provided at the bottom edge of the casing 1. Three piezoelectric transducers 13x, 13y and 13z contact the core 2 and are arranged at every 120 degrees with respect to the core 2. Strain signals output from the piezoelectric transducers 13x, 13y and 13z are transmitted and input in the electrical circuitry section 12 through lead wires 14. The electrical circuitry section 12 includes standard timing pulse generation circuitry and counting circuitry which measure and record the passage of time during which strain signals are generated by the piezoelectric transducers 13x, 13y and 13z. Reference numerals 15 and 16 indicate a battery and a power switch, respectively.

Figure 3:
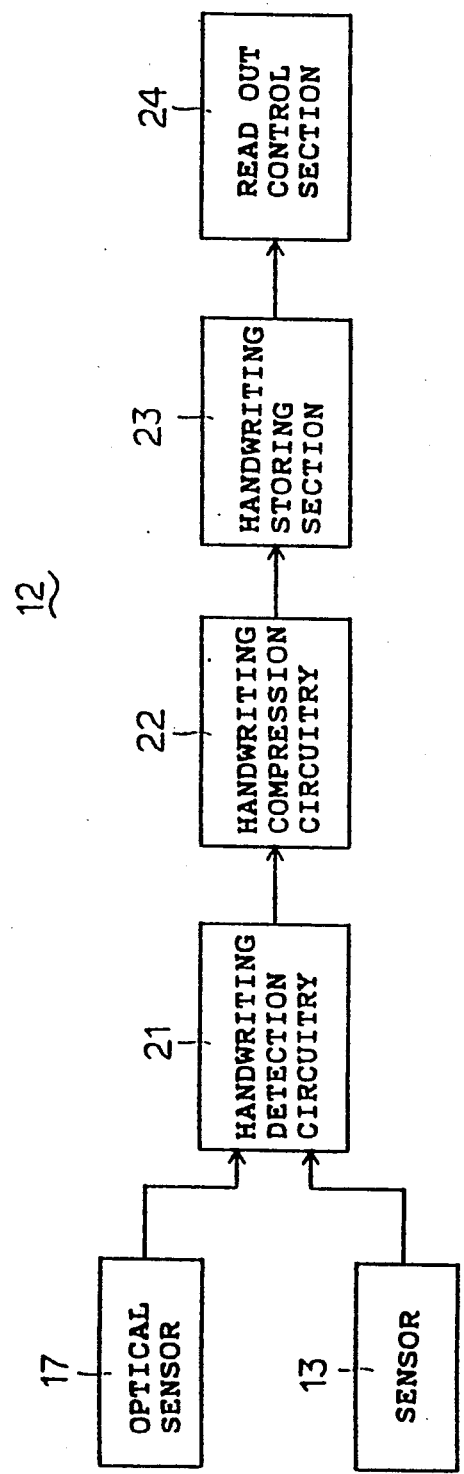
FIG. 3 is a block diagram showing an arrangement of an electrical circuitry section of the writing device shown in FIG. 1.

FIG. 3 shows a circuit arrangement of the electrical circuitry section 12.

The electrical circuitry section 12 includes handwriting detection circuitry 21, handwriting compression circuitry 22, a handwriting storing section 23 and a read out control section 24. The handwriting detection circuitry 21 detects the locus of the ball point pen based on signals output from an optical sensor 17 which includes lenses 6x, 6y and 6z, the optical fibers 7, the lens 9 and the CCD chip 10, and a sensor 13 which includes piezoelectric transducers 13x, 13y and 13z. More particularly, for example, the moving direction of the writing device can be detected based on signals output from the piezoelectric transducers 13x, 13y and 13z. The moving direction of the writing device can also be detected based on images obtained by the optical sensor 17. The distance moved by the writing device can be detected based on a continuing time period of a predetermined combination of the signals output from the piezoelectric transducers 13x, 13y and 13z. The distance moved by the writing device can also be detected based on images obtained by the optical sensor 17. The handwriting compression circuitry 22 compresses a detected signal indicative of handwriting. The handwriting storing section 23 stores the compressed signal indicative of handwriting. The read out control section 24 reads out the compressed signal indicative of handwriting and outputts therefrom.

Operations for storing characters, figures and the like using the writing device according to the first embodiment of the present invention are as follows.

Figure 4:
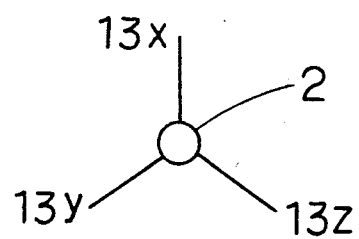
FIG. 4 is a diagram useful in understanding stress sensors.
Figure 5:
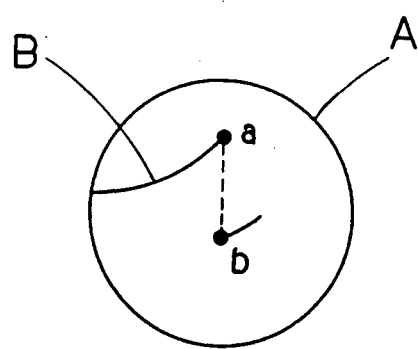
FIG. 5 is a diagram useful in understanding optical sensors.
Figure 6:
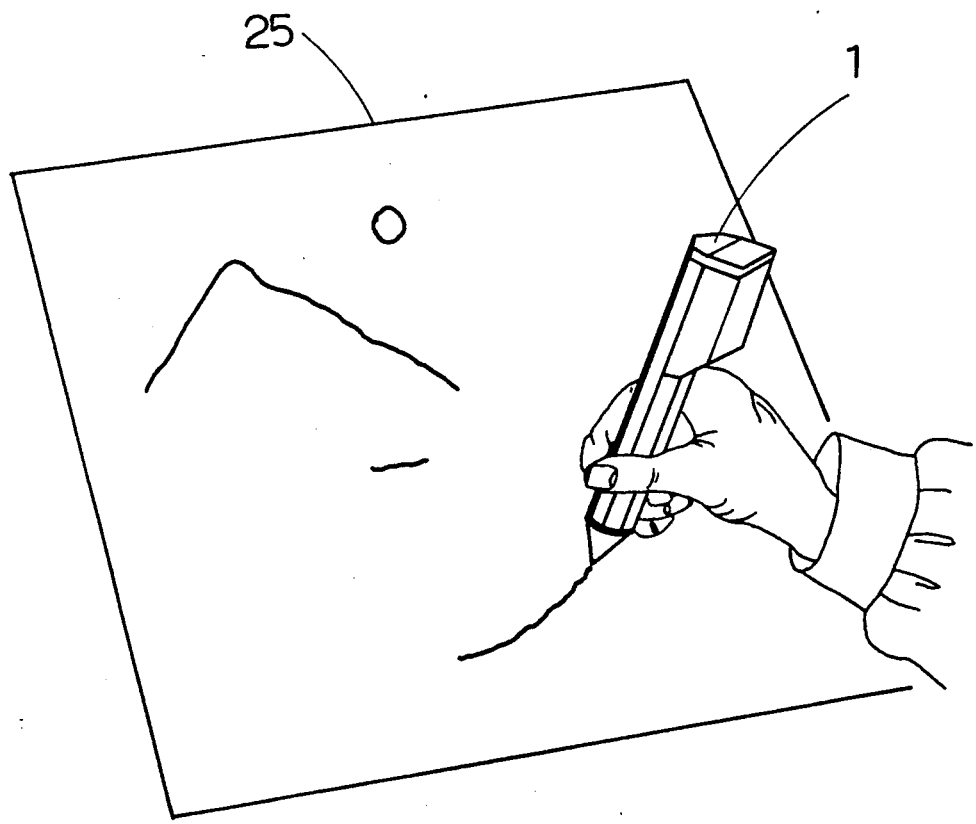
FIG. 6 is a diagram showing an example of Japanese characters which are being written on paper using the writing device according to the first embodiment of the present invention.

In the description, it is supposed that Japanese characters " " and " " are to be written on paper 25 by grasping the writing device 1 which has its core 2 projected as is illustrated in FIG. 6. At first, the core 2 is pressure contacted with the paper 25 to write the portion " " of Japanese character " ", then the bottom edge of the writing device 1 is moved in an upper rightward direction. When the core 2 is contacted with the paper 25, strain signals output from the piezoelectric transducers 13x, 13y and 13z vary depending upon contact of the core 2 with the paper 25, lack of contact of the core 2 with the paper 25 and the moving direction because the piezoelectric transducers 13x, 13y and 13z are disposed with respect to the core 2 as is illustrated in FIG. 4. Therefore, the moving direction and the moving distance of the core 2 can be detected based on the strain signals output from the piezoelectric transducers 13x, 13y and 13z when the core 2 is contacted with the paper 25.

After the portion " " is written, the core 2 is apart from the paper 25 and moves in upper direction to write the remaining portion " ". The moving direction and the moving distance, under the condition that the core 2 is apart from the paper 25, are detected by the optical sensor 17. When it is supposed that a viewing region of the optical sensor 17 is illustrated by a circle A, the prior written locus is illustrated by a line B having an end point a and the next contacting point is illustrated by a point b. The relative position and distance of the point b with respect to the end point a is detected by the optical sensor 17. The handwriting detection circuitry 21 detects a series of handwriting including the contacted portion and non-contacted portion based on signals output from the sensor 13 and the optical sensor 17. The handwriting detection signal is compressed by thinning or the like by the handwriting compression circuitry 22 and the compressed handwriting signal is stored in the handwriting storing section 23 sequentially.

When the writing device is employed, it is sufficient to bring only the writing device even when a man goes anywhere such as on his way to store contents as they are which are written on paper or the like because the writing device stores handwriting of characters, figures and the like in the handwriting storing section 23 which is incorporated in the writing device 1. It is preferable that a switch or the like is further provided for indicating punctuation of a character, figure or the like.

SECOND EMBODIMENT

Figure 7:
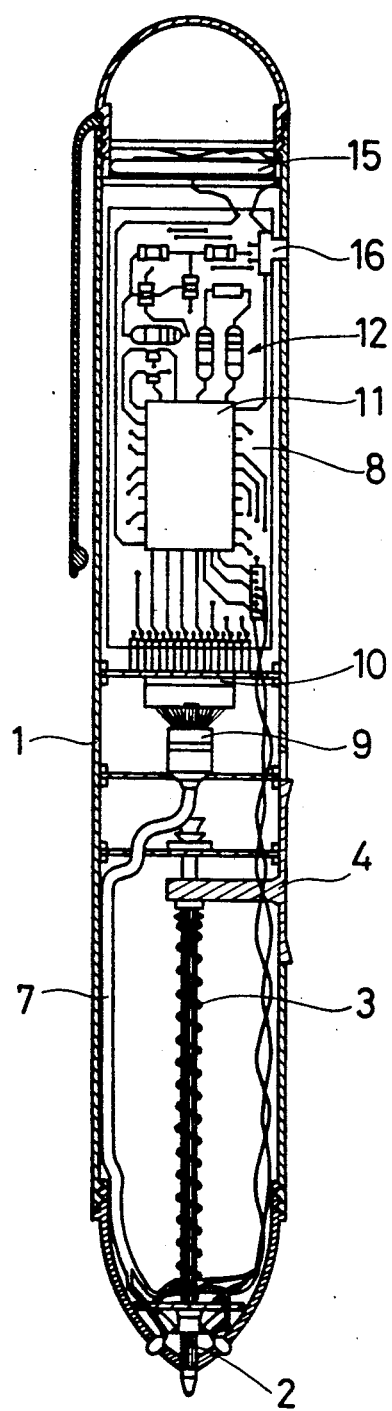
FIG. 7 is a cross-sectional view showing an inner mechanism of a writing device for storing handwriting according to a second embodiment of the present invention.
Figure 8:
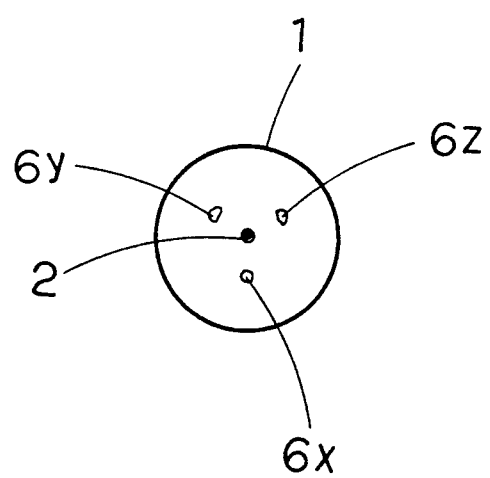
FIG. 8 is a bottom view of the writing device shown in FIG. 7.

FIG. 7 is a cross-sectional view showing an inner mechanism of a writing device for storing handwriting according to a second embodiment of the present invention, while FIG. 8 is a bottom view thereof.

The writing device shown in FIG. 7 differs from the embodiment shown in FIG. 1 in that a CCD chip 10 having smaller size is employed, the circuit board 8 is disposed horizontally, and the lens 9 is disposed beneath the circuit board 8. The lens 9 is opposite to the CCD chip 10, in the vertical direction.

The writing device shown in FIG. 7 can be smaller in size than the writing device shown in FIG. 1 which has a large upper portion due to its large size CCD chip 10.

Figure 9:
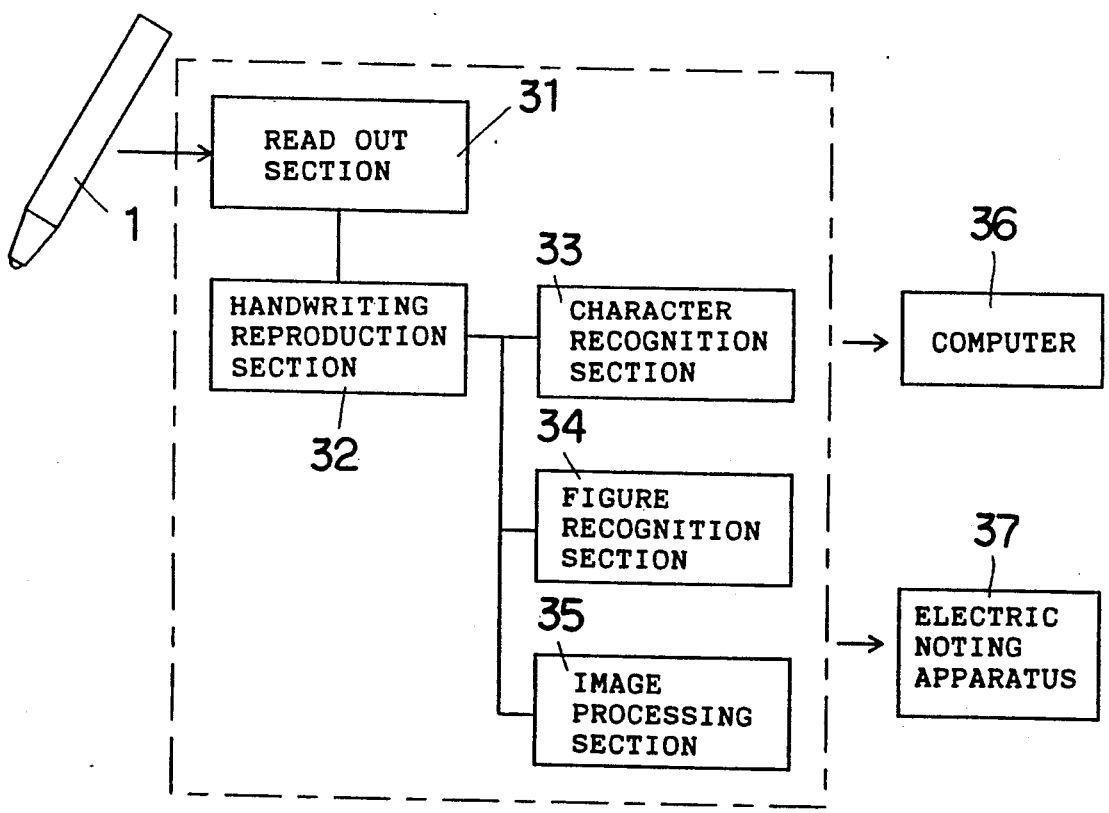

When the writing device 1 shown in FIG. 7 is employed, the writer can reproduce the original characters, figures and the like to some degree by displaying or printing out the handwriting read out from the handwriting storing section 23. The original characters, figures and the like can be perfectly reproduced by supplying the handwriting read out from the handwriting storing section 23 to an apparatus 30 which is shown in FIG. 9.

The apparatus 30 includes a read out section 31, a handwriting reproduction section 32, a character recognition section 33, a figure recognition section 34 and an image processing section 35. The read out section 31 reads data representative of handwriting out from the writing device 1. The handwriting reproduction section 32 perfectly reproduces data representative of the original handwriting based on the read out data. The character recognition section 33, the figure recognition section 34 and the image processing section 35 cooperate or selectively operate to securely reproduce meaning information in the read out data. The reproduced meaning information are input in a computer 36 or an electric noting apparatus 37. That is, the contents stored in the handwriting storing section 23 of the writing device 1 can be input, as they are, to an electric processing apparatus such as a computer without any keyboard, character input apparatus or the like.

THIRD EMBODIMENT

Figure 10:
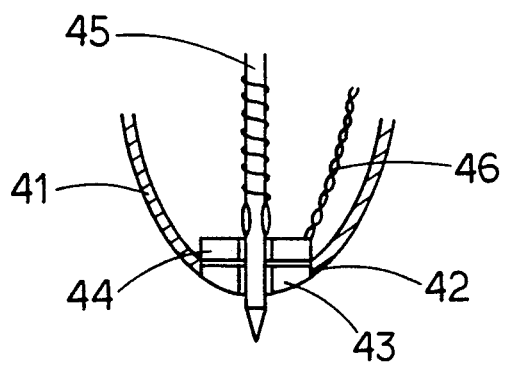
FIG. 10 is a cross-sectional view showing a mechanism at a bottom edge portion of a writing device for storing handwriting according to a third embodiment of the present invention.

FIG. 10 is a cross-sectional view showing a mechanism at a bottom edge portion of a writing device for storing handwriting according to a third embodiment of the present invention.

The writing device for storing handwriting has a simplified optical arrangement as follows.

A casing 41 of the writing device has an opening 42 at its bottom edge. A light collecting lens 43 is provided in the opening 42, the lens 43 having a through hole at its optical central axis so as to have a ring shape. A light receiving device 44 such as a CCD chip or the like is provided above lens 43 in a close position with respect to the light collecting lens 43. The light receiving device 44 has a through hole at its optical central axis so as to have a ring shape. A core 45 of a ball point pen is disposed in the casing 41 in a manner so that it is movable out and in with respect to the opening 42 through the light collecting lens 43 and the light receiving device 44. The light receiving device 44 receives light and transforms the received light to electrical signals which are guided to the electrical circuitry section 12 through lead wires 46.

When this embodiment is employed, an image within a predetermined region surrounding the leading edge of the ball point pen is obtained by the light collecting lens 43 and the light receiving device 44. The locus of the leading edge of the ball point pen is optically detected and stored based on the image.

The embodiment overcomes disadvantages such as difficulty in connecting optical fibers at a narrow spaced portion of the writing device and the like because signals output from the light receiving device 44 are transmitted to the electrical circuitry section 12 through lead wires 46.

FOURTH EMBODIMENT

Figure 11:
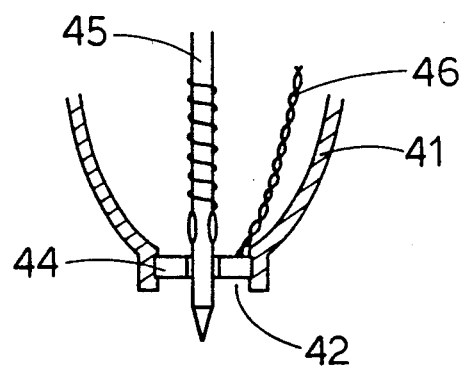
FIG. 11(A) is a cross-sectional view showing a mechanism at a bottom edge portion of a writing device for storing handwriting according to a fourth embodiment of the present invention.
FIG. 11(B) is a bottom view of a light receiving device incorporated in the writing device according to the fourth embodiment of the present invention.
FIG. 11(C) is a bottom view of a light receiving device having a modified arrangement, incorporated in the writing device according to the fourth embodiment of the present invention.
Figure 11:
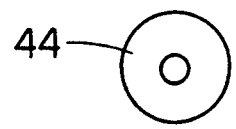
Figure 11:
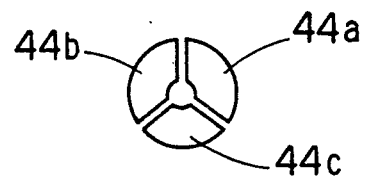

FIG. 11(A) is a cross-sectional view showing a mechanism at a bottom edge portion of a writing device for storing handwriting according to a fourth embodiment of the present invention.

The embodiment differs from the embodiment shown in FIG. 10 in that the light collecting lens 43 is omitted. That is, the light receiving device 44 such as a CCD chip or the like is provided in the opening 42, the light receiving device 44 having a through hole at its optical central axis so as to have a ring shape (refer to FIG. 11(B)). The core 45 of a ball point pen is disposed in the casing 41 in a manner so that it is movable out and in with respect to the opening 42 through the light receiving device 44. Electrical signals output from the light receiving device 44 are guided to the electrical circuitry section 12 through lead wires 46.

The light receiving device 44 may have three fan-shaped light receiving components 44a, 44b and 44c which are combined to form a ring shape as a whole (refer to FIG. 11(C)).

FIFTH EMBODIMENT

Figure 12:
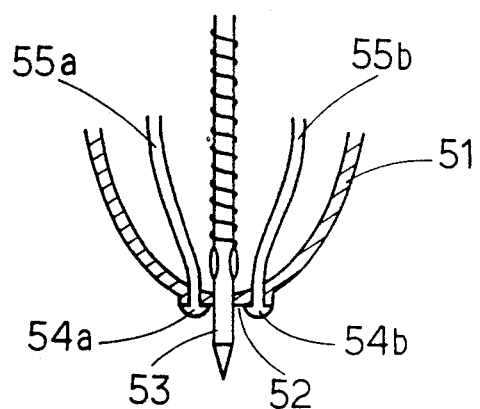
FIG. 12 is a cross-sectional view showing a mechanism at a bottom edge portion of a writing device for storing handwriting according to a fifth embodiment of the present invention.

FIG. 12 is a cross-sectional view showing a mechanism at a bottom edge portion of a writing device for storing handwriting according to a fifth embodiment of the present invention.

A casing 51 of the writing device has an opening 52 at its bottom edge and a core 53 of a ball point pen in a manner so that it is movable out and in with respect to the opening 52. Two light collecting lenses 54a and 54b are provided at the bottom edge portion of the casing 51 in a projected outward manner. The two light collecting lenses 54a and 54b are synmetrically disposed with respect to the core 53. Optical signals representative of handwriting received by these lenses 54a and 54b are guided to a light receiving face of a light receiving device such as a CCD chip or the like which is disposed over the lenses 54a and 54b through two bandled optical fibers 55a and 55b.

Figure 13:
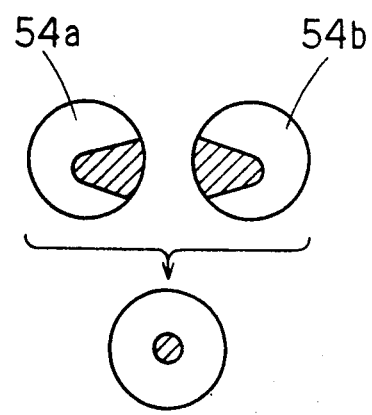
FIG. 13 is a diagram useful in understanding the dead angles of lenses and a compensation function shown in FIG. 12.

The lenses 54a and 54b have dead angles due to the core 53 of the ball point pen (refer to hatching portions in FIG. 13). But the dead angles are compensated by overlapping images obtained by corresponding lenses 54a and 54b so as to obtain an image corresponding to the leading edge portion of the core 53. Handwriting of the core 53 is sufficiently stored in the handwriting storing section 23.

SIXTH EMBODIMENT

Figure 14:
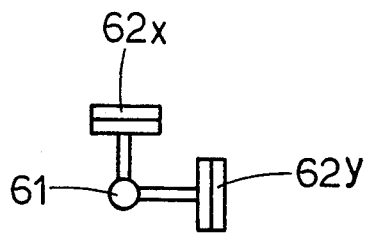
FIG. 14(A) is a plan view showing a mechanism at a bottom edge portion of a writing device for storing handwriting according to a sixth embodiment of the present invention.
FIG. 14(B) is a side view of the writing device according to the sixth embodiment of the present invention.
Figure 14:
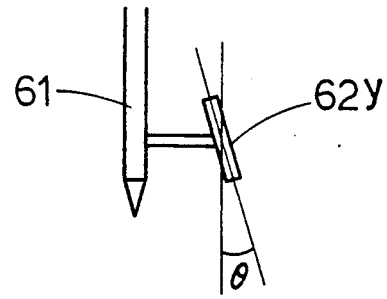

FIG. 14(A) is a plan view showing a mechanism at a bottom edge portion of a writing device for storing handwriting according to a sixth embodiment of the present invention, while FIG. 14(B) is a side view thereof.

FIG. 14(A) illustrates only a core 61 of a ball point pen, an x-piezoelectric transducer 62x and a y-piezoelectric transducer 62y. The x-piezoelectric transducer 62x and the y-piezoelectric transducer 62y are disposed at a 90 degrees shifted position with respect to one another and with respect to the core 61 (z-axis). The x-piezoelectric transducer 62x and the y-piezoelectric transducer 62y are push-pull type piezoelectric transducers and sensitive to stress caused by pushing and pulling. Strain within 360 degrees with respect to the core 61 (z-axis) are detectable by these piezoelectric transducers 62x and 62y.

Piezoelectric transducers 62x and 62y are disposed in an inclined condition with respect to the z-axis. Components in the z-axis direction are accordingly detected as stress signals even when handwriting is obtained without moving the core 61 in a x-axis direction and a y-axis direction on paper, such as by making a dot.

SEVENTH EMBODIMENT

Figure 15:
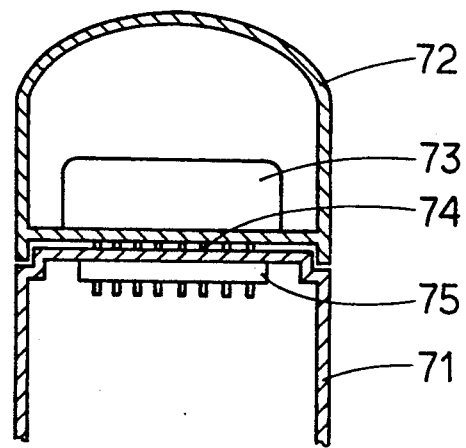
FIG. 15 is a cross-sectional view showing an inner arrangement at a top edge portion of a writing device for storing handwriting according to a seventh embodiment of the present invention.

FIG. 15 is a cross-sectional view showing an inner arrangement at a top edge portion of a writing device for storing handwriting according to a seventh embodiment of the present invention.

The writing device includes a cylindrical casing 71 and an upper casing 72 which is removably mounted to the top portion of the cylindrical casing 71. The upper casing 72 includes a handwriting storing section 73 therein which has a connecting plug 74 at one body. When the upper casing 72 is mounted to the cylindrical casing 71, the connecting plug 74 is inserted to a connector 75 provided at the top edge of the cylindrical casing 71 so as to electrically connect the handwriting storing section 73 with an electrical circuitry section housed in the cylindrical casing 71. That is, the upper casing 72 is a removable cartridge-type casing for removably mounting the handwriting storing section 73.

When this embodiment is employed, the handwriting storing section 73 can be replaced with a new one when the handwriting storing section 73 fully stores handwriting. Consequently, the handwriting in a long sentence and/or figure can be stored without being limited by the memory capacity of the handwriting storing section 73.

In the foregoing embodiments, it is described that an optical sensor and/or piezoelectric transducers are employed for detecting handwriting, a gyrocompass also may be used to detect handwriting. When a gyrocompass is employed, moving of the writing device can be detected nevertheless, whether the writing device contacts with paper or the like or not. The locus of the core of the writing device can be detected by utilizing the rotation of a ball of a ball point pen, flowing quantity of ink, or reaction at the leading edge of the writing device.

The terms and expressions which have been employed are used as terms of description and not of limitation, and there is no intention, in the use of such terms and expressions, to exclude equivalents of the features shown and described, or portions thereof, it being recognized that various modifications are possible within the scope of the invention as claimed.

What is claimed is:

1. A writing device for storing locus data which represents contacting movements which occur when said writing device moves during contact with a writing surface and non-contacting movements which occur when said writing device is not in contact with a writing surface, said writing device comprising:

writing means;

stress sensor means for detecting force applied to said writing means while said writing means is moved in contact with said writing surface for sensing handwriting on said writing surface;

optical sensing means for optically detecting relative positions of said writing means and handwriting written thereby when said writing means has been moved while not in contact with said writing surface;

locus detection means for detecting said contacting movements and said non-contacting movements of said writing means based upon signals output from said stress sensor means and said optical sensing means, and providing locus data representative thereof;

storing means for storing said detected locus data; and casing means for housing said writing means, said stress sensor means, said optical sensing means, and said storing means therein.

2. A writing device as set forth in claim 1, wherein said casing means is arranged with two casing part means which are removably mountable to one another and said storing means is housed in one of said casing part means.

3. A writing device as set forth in claim 1, wherein said optical sensing means includes a lens, an optical fiber and a charge coupled device chip.

4. A writing device as set forth in claim 3, wherein said optical sensing means includes three lenses which are disposed at every 120 degrees in shifted positions with respect to said writing means.

5. A writing device as set forth in claim 1, wherein said optical sensing means includes a lens which surrounds said writing means and a charge coupled device chip which also surrounds said writing means.

6. A writing device as set forth in claim 1, wherein said optical sensing means includes only a charge coupled device chip which surrounds said writing means.

7. A writing device as set forth in claim 1, wherein said optical sensing means includes at least one pair of lenses which are disposed symmetrically with respect to said writing means, a charge coupled device chip and image compensation means for obtaining an image of a leading edge of said writing means based on image signals corresponding to each lens obtained by said charge coupled device chip.

* * * * *